United States Patent
Modi et al.

(10) Patent No.: US 10,375,189 B2
(45) Date of Patent: Aug. 6, 2019

(54) SYSTEM AND METHOD FOR DECOUPLING A SOURCE APPLICATION FROM A TARGET APPLICATION IN AN INTEGRATION CLOUD SERVICE

(71) Applicant: Oracle International Corporation, Redwood Shores, CA (US)

(72) Inventors: Rajan Modi, Highlands Ranch, CO (US); Rajesh Raheja, Cupertino, CA (US); Greg Gravenites, Littleton, CO (US); Herb Stiel, San Francisco, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 149 days.

(21) Appl. No.: 15/174,661

(22) Filed: Jun. 6, 2016

(65) Prior Publication Data
US 2016/0359964 A1    Dec. 8, 2016

Related U.S. Application Data

(60) Provisional application No. 62/171,159, filed on Jun. 4, 2015.

(51) Int. Cl.
*G06F 15/173* (2006.01)
*H04L 29/08* (2006.01)

(52) U.S. Cl.
CPC .................................. *H04L 67/26* (2013.01)

(58) Field of Classification Search
None
See application file for complete search history.

(56) References Cited

U.S. PATENT DOCUMENTS

| 8,099,480 | B1 | 1/2012 | Muthusrinivasan et al. |
| 8,412,768 | B2 * | 4/2013 | Rajaraman .......... H04L 67/2823 708/105 |

(Continued)

OTHER PUBLICATIONS

Oracle® Fusion Middleware, An Oracle White Paper, Simplifying Cloud Integration, Copyright © 2014, Jan. 2014, 18 pages.

(Continued)

*Primary Examiner* — Umar Cheema
*Assistant Examiner* — Gregory P Tolchinsky
(74) *Attorney, Agent, or Firm* — Tucker Ellis LLP (57) ABSTRACT

In accordance with an embodiment, described herein is a system and method for decoupling a source application and a target application using a messaging service associated with a cloud-based integration service. A first integration flow can be provided to enable the source application or producer to publish messages to the messaging service. A second integration flow can be provided to enable the target application or consumer to subscribe to the messaging service to receive messages. The source application and the target application can be agnostic of each other's implementation details, and those of the messaging service, which effectively decouples the source and target applications. The system enables objects between the source and target applications to be sychronized, multiple applications to subscribe to the integration cloud service and register for updates, and one or more applications to be added or removed as subscribers without affecting other subscribers or producers.

21 Claims, 6 Drawing Sheets

(56) References Cited

U.S. PATENT DOCUMENTS

| | | |
|---|---|---|
| 8,788,931 B1 | 7/2014 | Chen |
| 9,116,777 B1 | 8/2015 | Kiradjiev et al. |
| 2002/0116531 A1 | 8/2002 | Chu |
| 2007/0245013 A1 | 10/2007 | Saraswathy et al. |
| 2009/0125833 A1 | 5/2009 | Abernethy |
| 2009/0198548 A1 | 8/2009 | Kohler et al. |
| 2010/0042670 A1* | 2/2010 | Kamalakantha ...... G06F 9/5072 709/203 |
| 2011/0225565 A1 | 9/2011 | van Velzen et al. |
| 2012/0030275 A1 | 2/2012 | Boller |
| 2013/0041980 A1 | 2/2013 | Wickman |
| 2014/0100922 A1 | 4/2014 | Aycock |
| 2014/0129265 A1 | 5/2014 | Arena |
| 2015/0082196 A1 | 3/2015 | Berger |
| 2015/0188973 A1* | 7/2015 | Kacmarcik ........... H04L 65/607 715/719 |
| 2015/0317575 A1 | 11/2015 | Walker et al. |
| 2016/0011905 A1* | 1/2016 | Mishra .................. G06Q 10/06 718/102 |
| 2016/0182309 A1 | 6/2016 | Maturana |
| 2016/0196532 A1 | 7/2016 | De |
| 2016/0359689 A1 | 12/2016 | Herreria |
| 2017/0054948 A1* | 2/2017 | Angel .................... H04N 5/772 |
| 2017/0288940 A1 | 10/2017 | Lagos et al. |

OTHER PUBLICATIONS

United States Patent and Trademark Office, Office Action dated Jul. 19, 2018 for U.S. Appl. No. 15/174,658, 25 Pages.

\* cited by examiner

SYSTEM AND METHOD FOR DECOUPLING A SOURCE APPLICATION FROM A TARGET APPLICATION IN AN INTEGRATION CLOUD SERVICE

CLAIM OF PRIORITY

This application claims the benefit of priority to U.S. Provisional Application titled "SYSTEM AND METHOD FOR PROVIDING A MESSAGING SERVICE FOR USE IN INTEGRATION CLOUD SERVICE RUNTIME ENVIRONMENT", Application No. 62/171,159, filed Jun. 4, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to integration cloud service (ICS), and are particularly related to a system and method for decoupling a source application from a target application using a messaging service associated with a cloud-based integration service.

BACKGROUND

The rapid shift from on-premises applications to a hybrid mix of Software-as-a-Service (SaaS) and on-premises applications has introduced challenges for companies attempting to simplify enterprise application integration. Integration platform as a service (iPaaS) may rely on integration flows to map data from one application to another. However, the mapped applications in such integration flows may be tightly coupled. If either application changes, the integration flow needs to be modified.

SUMMARY

In accordance with an embodiment, described herein is a system and method for decoupling a source application and a target application using a messaging service associated with a cloud-based integration service. A first integration flow can be provided to enable the source application or producer to publish messages to the messaging service. A second integration flow can be provided to enable the target application or consumer to subscribe to the messaging service to receive messages. The source application and the target application can be agnostic of each other's implementation details, and those of the messaging service, which effectively decouples the source and target applications. The system enables objects between the source and target applications to be sychronized, multiple applications to subscribe to the integration cloud service and register for updates, and one or more applications to be added or removed as subscribers without affecting other subscribers or producers.

DETAILED DESCRIPTION

Integration platform as a service, for example, Oracle integration cloud service (ICS), can provide a cloud-based platform for building and deploying integrations flows that connect applications residing in the cloud or on-premises.

In accordance with an embodiment, an ICS can deliver real-time event-driven cloud to cloud and cloud to on-premise integrations. Such a solution can simplify connectivity between enterprise applications such as Fusion Applications, RightNow, Eloqua, E-Business Suite and other third party Software as a Service (SaaS) and on-premises applications. An ICS allows users to build and deliver integrations in a more agile fashion with much lower capital expense and effort by working with SaaS applications on a common integration platform.

In accordance with an embodiment, an ICS can provide an integration platform in the cloud to maximize companies' investments in SaaS and on-premises applications. An ICS can include an intuitive web based integration designer for point and click integration between applications and a rich monitoring dashboard that provides real-time insight into the transactions, all running on a mature runtime platform on a public cloud. An ICS can accelerate integration projects and significantly shorten the time-to-market through its intuitive and simplified designer, an intelligent data mapper, and a library of adapters to connect to various applications.

Figure 1:
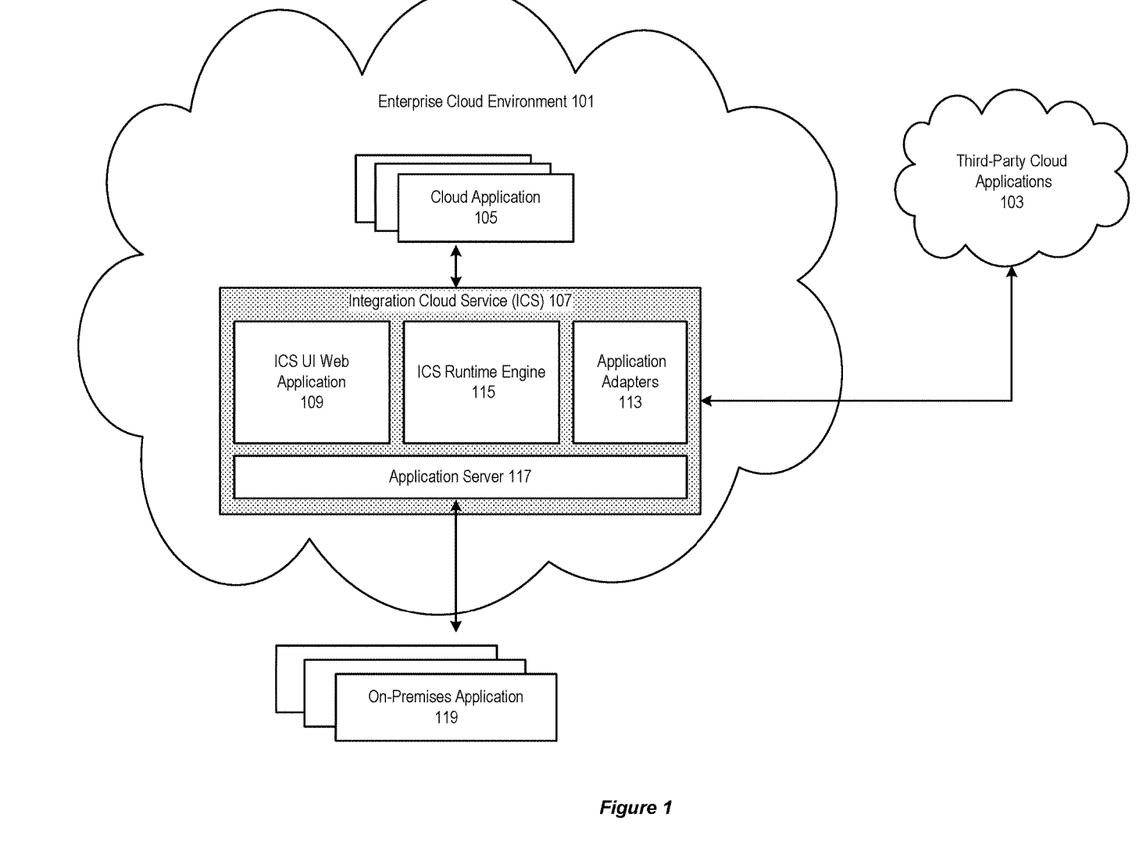
FIG. 1 illustrates an integration cloud service, in accordance with an embodiment.

FIG. 1 illustrates an integration cloud service in accordance with an embodiment.

As shown in FIG. 1, an ICS 107 can provide a cloud-based integration platform for designing, executing, and managing ICS integration flows. The ICS can include a web application 109 and an ICS runtime 115 executing on an application server 117 in an enterprise cloud environment (for example, Oracle Public Cloud) 101. The web application can provide a design time that exposes a plurality of user interfaces for a developer to design, activate, manage, and monitor an ICS integration flow. An activated ICS integration flow can be deployed and executed on the ICS runtime.

In accordance with an embodiment, a plurality of application adapters 113 can be provided to simplify the task of configuring connections to a plurality of applications, by handling the underlying complexities of connecting to those applications. The applications can include enterprise cloud applications of the ICS vendor (for example, Oracle RightNow) 105, third-party cloud applications (for example, Salesforce) 103, and on-premises applications 119. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime.

Decoupling a Source Application and a Target Application

In the integration flow as described, a source application and a target application may be tightly coupled. If either application changes, the integration flow needs to be modified.

In accordance with an embodiment, the system can be used to decouple a source application and a target application using a messaging service associated with a cloud-based integration service. A first integration flow can be provided to enable the source application or producer to publish messages to the messaging service. A second integration flow can be provided to enable the target application or consumer to subscribe to the messaging service to receive messages. The source application and the target application can be agnostic of each other's implementation details, and those of the messaging service, which effectively decouples the source and target applications. The system enables objects between the source and target applications to be sychronized, multiple applications to subscribe to the integration cloud service and register for updates, and one or more applications to be added or removed as subscribers without affecting other subscribers or producers.

Figure 2:
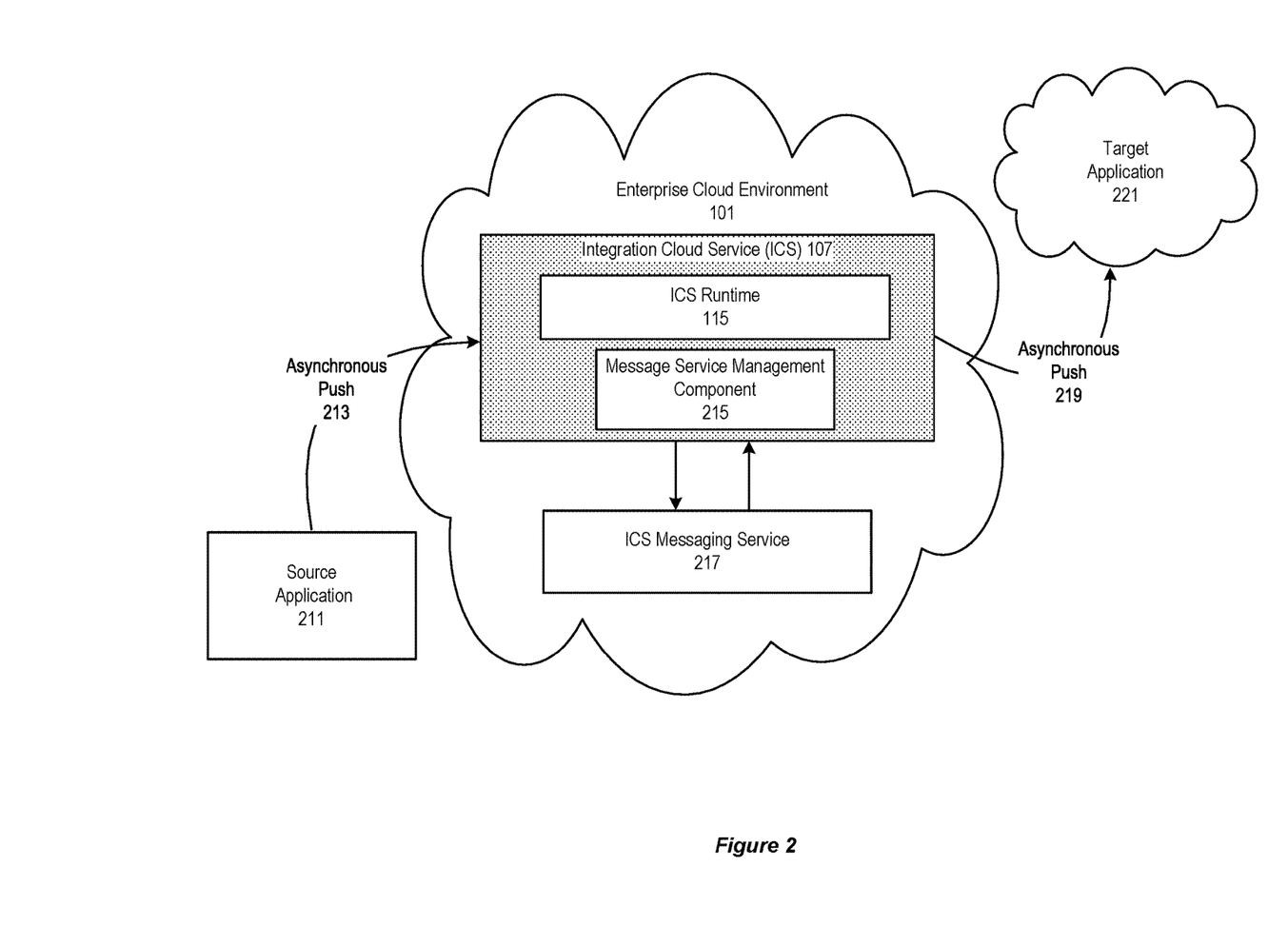
FIG. 2 illustrates a system for decoupling a source application and a target application in an integration cloud service (ICS), in accordance with an embodiment.

FIG. 2 illustrates a system for decoupling a source application and a target application in an integration cloud service (ICS), in accordance with an embodiment.

As shown in FIG. 2, a messaging service 217 enables a source application 211 to publish messages to the ICS, and a target application 221 to subscribe to the ICS. The messaging service can serve as a medium for bridging the source application and the target application. The source application can asynchronously push 213 one or more messages to the messaging service. The target system can receive messages that are asynchronously pushed 219 by the messaging service.

In accordance with an embodiment, the messaging service can be implemented using a plurality of different technologies, for example, Java Message Queue (JMS) or Oracle Messaging Service (OMS). A management component 215 can be provided to manage the communication between the ICS and the messaging service, including managing queues or topics underlying the messaging service.

In accordance with an embodiment, the messaging service can provide a plurality of mechanisms to ensure reliable delivery of data. For example, groups of sent and received messages to be grouped into a single atomic operation. If one send or receive in the group fails, all sends and receives in the group can be "undone".

In accordance with an embodiment, the source application can asynchronously push messages to the ICS using simple object access protocol (SOAP) or representational state transfer (REST) protocols, and a plurality of REST APIs exposed by the ICS.

In accordance with an embodiment, by using the messaging service as a medium between the source application and the target application, the two applications can be decoupled, enabling objects between the source and target applications to be synchronized. In addition, multiple applications can subscribe to the ICS and register for updates, and one or more applications can be added or removed as subscribers without affecting other subscribers or producers.

In accordance with an embodiment, the decoupling of the source application and the target application can be achieved by combining two types of integration flows. The first type is a publishing integration flow that enables the source application to publish messages to the messaging service. The second type is a subscribing integration flow that enables a target application to receive messages from the messaging service.

Figure 3:
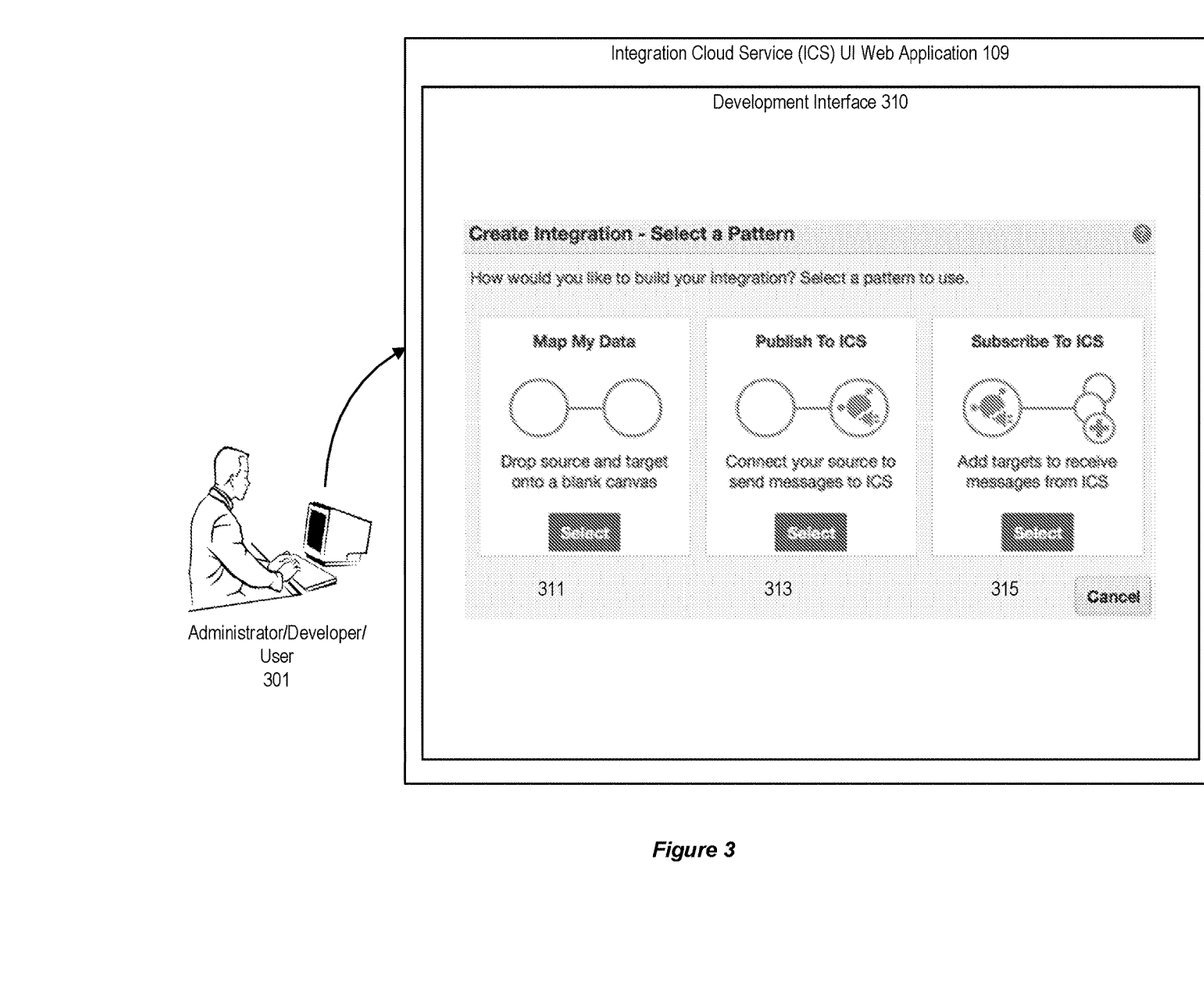
FIG. 3 illustrates a user interface for creating a publishing integration flow and a subscribing integration flow, in accordance with an embodiment.

FIG. 3 illustrates a user interface for creating a publishing integration flow and a subscribing integration flow, in accordance with an embodiment.

As shown in FIG. 3, the ICS can support a plurality of different types of integration flow patterns, for example, a data mapping integration flow 311, a publishing integration flow 313, and a subscribing integration flow 315.

In accordance with an embodiment, in a data mapping integration flow, an ICS developer 301 can use an application adapter or an application connection to define a source application or a target application in an development interface (e.g., an integration designer) 310. Routing paths and data mappings between the source and target application can also be defined.

In accordance with an embodiment, in a publishing integration flow, a source application or a service can be configured to publish messages to the ICS through a pre-defined messaging service that can be automatically created if this type of integration flow type is chosen. In a subscribing integration flow, an target application or service can be configured to subscribe to messages from the ICS through the messaging service, which can be also be automatically created if this type of integration flow type is chosen.

Figure 4:
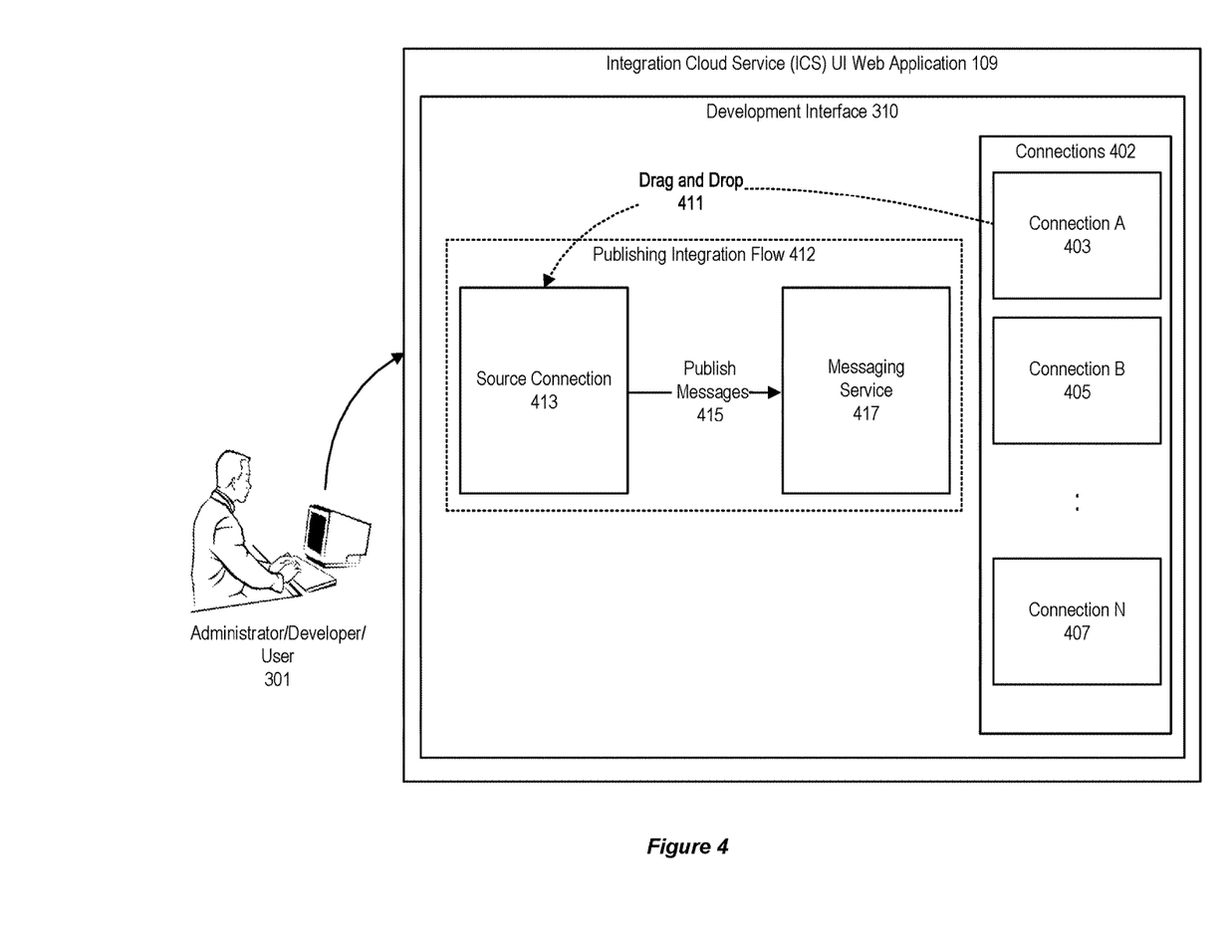
FIG. 4 illustrates a publishing integration flow in an ICS design time, in accordance with an embodiment.

FIG. 4 illustrates a publishing integration flow in an ICS design time, in accordance with an embodiment.

As shown in the FIG. 4, an ICS developer can create a publishing integration flow 412 in the development interface, using a plurality of existing connections 402, for example, connection A 403, connection B 405 and connection N 407.

As shown in FIG. 4, a particular connection (for example, connection A) can be dragged and dropped 411 onto the development interface as a source connection 413 that defines information for a source application (for example, an Oracle RightNow Cloud Application). The source application can publish 415 messages to a pre-defined messaging service 417.

In accordance with an embodiment, when the source connection is dragged onto the development interface, an interface for the source connection can be displayed, prompting the ICS developer to enter information such as an endpoint name, and an identifier for this connection. The wizard further allows the ICS developer to select an object (for example, an account), for which messages can be published to the messaging service.

In accordance with an embodiment, the publishing integration flow can be activated, so that it can be subscribed to by a subscribing integration.

In accordance with an embodiment, for messages published by the source application to be subscribed to by a subscribing integration flow, the ICS needs to be configured to act as a publisher, which enables the ICS to publish the messages, to which other adapters or connections can subscribe.

Figure 5:
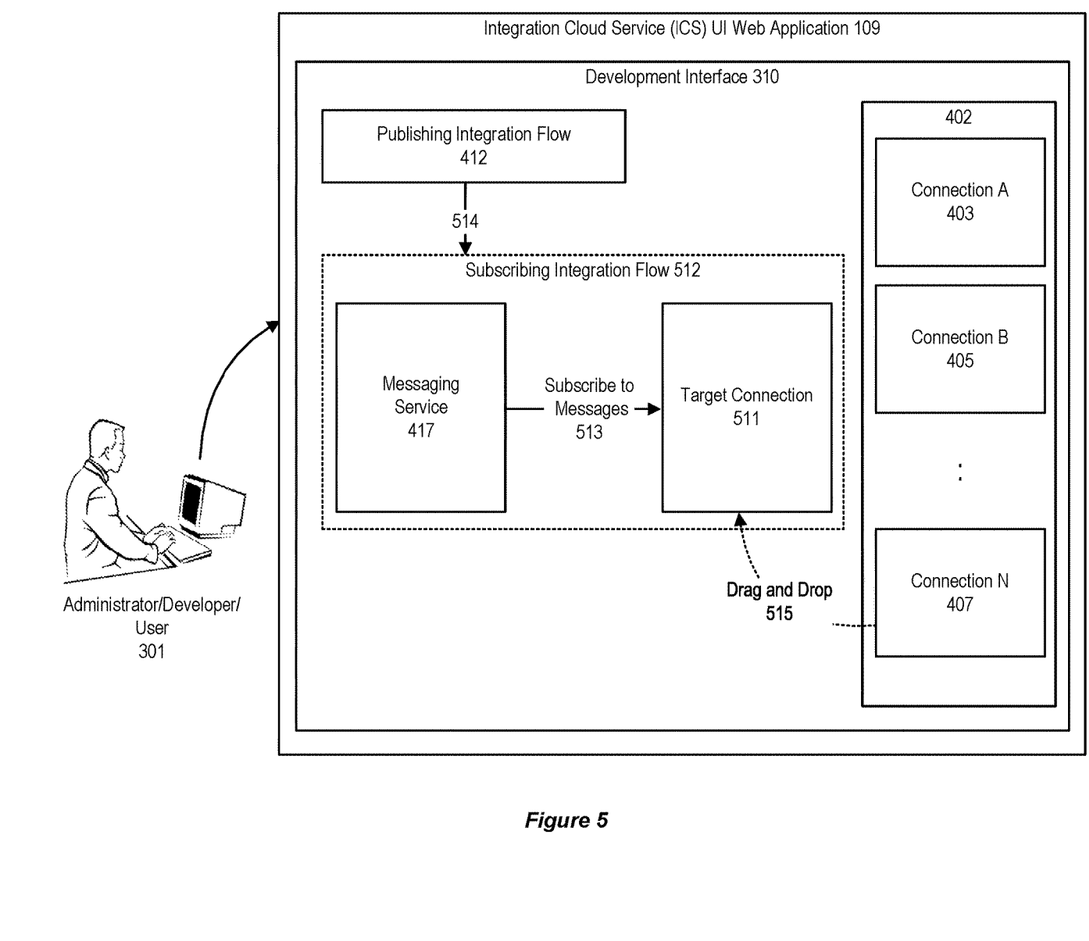
FIG. 5 illustrates a subscribing integration flow in an ICS design time, in accordance with an embodiment.

FIG. 5 illustrates a subscribing integration flow in an ICS design time, in accordance with an embodiment.

In accordance with an embodiment, a subscribing integration flow 512 can be created by dragging and dropping 515 a target connection 511 or adapter onto the development interface. After the target connection is dragged and dropped, the ICS developer can be prompted to select a publisher to which to subscribe 513 through the messaging service.

For example, the publishing integration flow created above can be displayed for the ICS developer to select 514. To be subscribed to, a publishing integration flow needs to be completely configured, although it can be inactive.

In accordance with an embodiment, one or more operations and objects can be selected from the target application represented by the target connection. For example, a "create" operation and an organization object can be selected. A mapper can also be available for use in mapping source fields in the source application to the corresponding target fields in the target application.

In accordance with an embodiment, after the publishing integration flow and the subscribing integration flow are both activated, the completed publishing and subscribing integration flows can create a corresponding object in the target application, in response to an object being created in the source application.

For example, when an account is created in the source application (for example, Oracle Sales Cloud), the completed publishing and subscribing integration flows can cause an organization corresponding to the account object to be created in the target application (for example, Oracle RightNow Cloud application).

Other advantages of the completed publishing and subscribing integration flows include enabling multiple applications to subscribe to the ICS and be registered for updates, and additional subscribers to be added or removed without affecting other subscribers or publishers.

Figure 6:
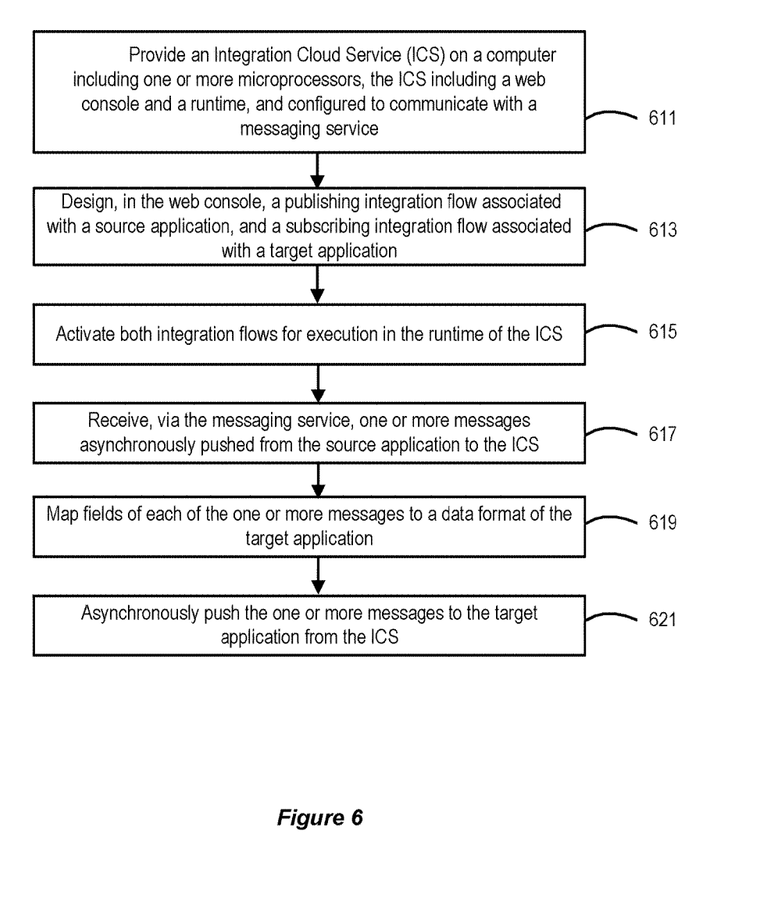
FIG. 6 illustrates a method for decoupling a source and target system in an integration flow, in accordance with an embodiment.

FIG. 6 illustrates a method for decoupling a source and target system in an integration flow, in accordance with an embodiment.

As shown in FIG. 6, at step 611, an ICS is provided on a computer including one or more microprocessors, the ICS including a web interface application for designing an integration flow, and a runtime for executing the integration flow, and configured to communicate with a messaging service.

At step 613, a publishing integration flow associated with a source application, and a subscribing integration flow associated with a target application is designed in the web interface application.

At step 615, the publish integration flow and the subscribing integration flow are activated for execution in the runtime of the ICS.

At step 617, the messaging service receives one or more messages asynchronously pushed from the source application to the ICS.

At step 619, the messaging service maps fields of each of the one or more messages to a data format of the target application.

At step 621, the messaging service asynchronously pushes the one or more messages to the target application from the ICS.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system in a cloud-based integration service for decoupling a source application producing messages and a target application consuming the messages, the system comprising:
   a computer comprising one or more microprocessors;
   a cloud service, executing on the computer, wherein the cloud service comprises a web interface application for creating one or more integration flows and wherein the cloud service comprises a runtime for executing the one or more integration flows;
   a publishing integration flow associated with the source application, the publishing integration flow permitting the source application producing the messages to publish the messages by pushing the messages from the source application via the publishing integration flow;
   a subscribing integration flow associated with the target application, the subscribing integration flow permitting the target application consuming the messages to subscribe to receive the messages via the subscribing integration flow, wherein the publishing integration flow and the subscribing integration flow are created in the web interface application, and wherein the publishing integration flow and the subscribing integration flow are activated for execution in the runtime of the cloud service; and
   a messaging service in operative communication with the cloud service, the messaging service operating as a medium between the source and target applications to decouple the source and target applications by:
      receiving one or more messages asynchronously pushed from the source application to the cloud service through the publishing integration flow,
      mapping fields of each of the one or more messages to a data format of the target application, and delivering the one or more messages to the target application from the cloud service through the subscribing integration flow, wherein the publishing and subscribing integration flows synchronize objects between the source and target applications by:

in response to an object being created in the source application, creating a corresponding object in the target application.

2. The system of claim 1, wherein the publishing integration flow publishes the one or more messages from the source application to the cloud service through the messaging service using representational state transfer (REST) or simple object access (SOAP) protocols.

3. The system of claim 1, wherein the subscribing integration flow subscribes to the cloud service through the messaging service using representational state transfer (REST) or simple object access (SOAP) protocols.

4. The system of claim 1, wherein an object created in the source application causes a creation of a corresponding object in the target application.

5. The system of claim 1, wherein the source application and the target application are agnostic of each other's implementation details, and those of the messaging service.

6. The system of claim 1, wherein the subscribing integration flow is configured to permit one or more additional applications to subscribe to the cloud service through the messaging service to receive the one or more messages published by the source application.

7. The system of claim 1, wherein one or more applications are configured to be added or removed as subscribers without impacting other subscribers or producers.

8. A method in a cloud-based integration service for decoupling a source application producing messages and a target application consuming the messages, the method comprising:

providing a cloud service on a computer including one or more microprocessors, the cloud service comprising a web interface application for creating integration flows and a runtime for executing the integration flows;

designing, in the web interface application, a publishing integration flow associated with the source application, the publishing integration flow permitting the source application producing the messages to publish the messages by pushing the messages from the source application via the publishing integration flow;

designing, in the web interface application, a subscribing integration flow associated with the target application, the subscribing integration flow permitting the target application consuming the messages to subscribe to receive the messages via the subscribing integration flow;

activating the publishing integration flow and the subscribing integration flow for execution in the runtime of the cloud service;

providing a messaging service in operative communication with the cloud service, the messaging service operating as a medium between the source and target applications to decouple the source and target applications by:

receiving one or more messages asynchronously pushed from the source application to the cloud service through the publishing integration flow;

mapping fields of each of the one or more messages to a data format of the target application; and delivering the one or more messages to the target application from the cloud service through the publishing integration flow; and synchronizing objects between the activated source and target applications by the publishing and subscribing integration flows by:

in response to an object being created in the activated source application, creating a corresponding object in the activated target application.

9. The method of claim 8, wherein the publishing integration flow publishes the one or more messages from the source application to the cloud service through the messaging service using representational state transfer (REST) or simple object access (SOAP) protocols.

10. The method of claim 8, wherein the subscribing integration flow subscribes to the cloud service through the messaging service using representational state transfer (REST) or simple object access (SOAP) protocols.

11. The method of claim 8, wherein an object created in the source application causes a creation of a corresponding object in the target application.

12. The method of claim 8, wherein the source application and the target application are agnostic of each other's implementation details, and those of the messaging service.

13. The method of claim 8, wherein the subscribing integration flow is configured to permit one or more additional applications to subscribe to the cloud service through the messaging service to receive the one or more messages published by the source application.

14. The method of claim 8, wherein one or more applications are configured to be added or removed as subscribers without impacting other subscribers or producers.

15. A non-transitory computer-readable storage medium storing a set of instructions for decoupling in a cloud-based integration service a source application producing messages and a target application consuming the messages, said set of instructions, when executed by one or more processors, causing the one or more processors to perform the steps comprising:

providing a cloud service on a computer including one or more microprocessors, the cloud service comprising a web interface application for creating integration flows and a runtime for executing the integration flows;

designing, in the web interface application, a publishing integration flow associated with the source application, the publishing integration flow permitting the source application producing the messages to publish the messages by pushing the messages from the source application via the publishing integration flow;

designing, in the web interface application, a subscribing integration flow associated with target application, the subscribing integration flow permitting the target application consuming the messages to subscribe to receive the messages via the subscribing integration flow;

activating the publishing integration flow and the subscribing integration flow for execution in the runtime of the cloud service;

providing a messaging service in operative communication with the cloud service, the messaging service operating as a medium between the source and target applications to provide the decoupling between the source and target applications by:

receiving one or more messages asynchronously pushed from the source application to the cloud service through the publishing integration flow;

mapping fields of each of the one or more messages to a data format of the target application; and delivering the one or more messages to the target application from the cloud service through the publishing integration flow; and synchronizing objects between the activated source and target applications by the publishing and subscribing integration flows by:

in response to an object being created in the activated source application, creating a corresponding object in the activated target application.

16. The non-transitory computer-readable storage medium of claim 15, wherein the publishing integration flow publishes the one or more messages from the source application to the integration cloud service through the messaging service using representational state transfer (REST) or simple object access (SOAP) protocols.

17. The non-transitory computer-readable storage medium of claim 15, wherein the subscribing integration flow subscribes to the integration cloud service through the messaging service using representational state transfer (REST) or simple object access (SOAP) protocols.

18. The non-transitory computer-readable storage medium of claim 15, wherein an object created in the source application causes a creation of a corresponding object in the target application.

19. The non-transitory computer-readable storage medium of claim 15, wherein the source application and the target application are agnostic of each other's implementation details, and those of the messaging service.

20. The non-transitory computer-readable storage medium of claim 15, wherein the subscribing integration flow is configured to permit one or more additional applications to subscribe to the integration cloud service through the messaging service to receive the one or more messages published by the source application.

21. The system of claim 1, wherein the publishing and subscribing integration flows synchronize the objects between the source and target applications by:

in response to an account being created in the source application, creating a corresponding organization in the target application.

\* \* \* \* \*

UNITED STATES PATENT AND TRADEMARK OFFICE
CERTIFICATE OF CORRECTION

PATENT NO. : 10,375,189 B2
APPLICATION NO. : 15/174661
DATED : August 6, 2019
INVENTOR(S) : Modi et al.

Page 1 of 1

It is certified that error appears in the above-identified patent and that said Letters Patent is hereby corrected as shown below:

On the Title Page

In Column 2, under Abstract, Line 14, delete "sychronized," and insert -- synchronized, --, therefor.

In the Specification

In Column 1, Line 59, delete "sychronized," and insert -- synchronized, --, therefor.

In Column 3, Line 30, delete "sychronized," and insert -- synchronized, --, therefor.

Signed and Sealed this
Twenty-eighth Day of July, 2020

Andrei Iancu
*Director of the United States Patent and Trademark Office*